(12) United States Patent
Coffing

(10) Patent No.: US 11,042,711 B2
(45) Date of Patent: Jun. 22, 2021

(54) PROCESSING NATURAL LANGUAGE ARGUMENTS AND PROPOSITIONS

(71) Applicant: Daniel L. Coffing, Fairfax, VA (US)

(72) Inventor: Daniel L. Coffing, Fairfax, VA (US)

(*) Notice: Subject to any disclaimer, the term of this patent is extended or adjusted under 35 U.S.C. 154(b) by 73 days.

(21) Appl. No.: 16/358,575

(22) Filed: Mar. 19, 2019

(65) Prior Publication Data

US 2019/0370335 A1 Dec. 5, 2019

Related U.S. Application Data

(60) Provisional application No. 62/645,114, filed on Mar. 19, 2018.

(51) Int. Cl.
*G06F 40/289* (2020.01)
*G06F 40/30* (2020.01)
*G06F 40/56* (2020.01)
*G06F 40/183* (2020.01)

(52) U.S. Cl.
CPC .......... *G06F 40/30* (2020.01); *G06F 40/183* (2020.01); *G06F 40/56* (2020.01)

(58) Field of Classification Search
CPC ...... G06F 40/289; G06F 40/30; G06F 40/166; G06F 40/183; G06F 40/205; G06F 40/253; G06F 40/35; G06F 40/40; G06F 40/56; G06F 16/334; G06F 16/36; G06F 16/43; G06F 16/90344; G06F 16/953; G06N 7/005; G06N 3/006; G06N 3/0436; G06N 20/00; G06N 3/02; G06N 5/02; G06N 5/047

USPC ........... 704/9, 120, 257, 10; 706/18, 46, 52; 707/999.006
See application file for complete search history.

(56) References Cited

U.S. PATENT DOCUMENTS

| | | | |
|---|---|---|---|
| 6,347,332 B1 | 2/2002 | Malet et al. | |
| 8,438,142 B2 | 5/2013 | Wu et al. | |
| 8,538,743 B2 | 9/2013 | Gago et al. | |
| 9,047,283 B1 | 6/2015 | Zhang et al. | |
| 9,916,538 B2 * | 3/2018 | Zadeh ................... | G06K 9/627 |
| 10,395,216 B2 | 8/2019 | Coffing et al. | |
| 2003/0084425 A1 | 5/2003 | Glaser | |

(Continued)

FOREIGN PATENT DOCUMENTS

| | | |
|---|---|---|
| EP | 3 769 238 | 1/2021 |
| WO | WO 2014/146086 | 9/2014 |

(Continued)

OTHER PUBLICATIONS

PCT Application No. PCT/US2019/023034 International Search Report and Written Opinion dated Jun. 21, 2019.

(Continued)

*Primary Examiner* — Vijay B Chawan
(74) *Attorney, Agent, or Firm* — Polsinelli LLP

(57) ABSTRACT

Natural language content can be provided by multiple and various sources. Once in text format, such content may be provided to various systems for further processing to identify one or more propositions. The relationship between each proposition may be identified and ordered according to the identified relationships. A visual display may be generated to illustrate the identified propositions and relationship, as well as identify any propositions that may be missing, unsupported, or other characteristic thereof.

19 Claims, 11 Drawing Sheets

(56) References Cited

U.S. PATENT DOCUMENTS

| | | | |
|---|---|---|---|
| 2006/0122834 A1 | 6/2006 | Bennett | |
| 2006/0200259 A1 | 9/2006 | Hoffberg et al. | |
| 2008/0222279 A1 | 9/2008 | Cioffi et al. | |
| 2009/0100053 A1* | 4/2009 | Boschee | G06F 16/334 |
| 2009/0117883 A1 | 5/2009 | Coffing et al. | |
| 2009/0144302 A1 | 6/2009 | Baldwin | |
| 2009/0192968 A1 | 7/2009 | Tunstall-Pedoe | |
| 2009/0326919 A1* | 12/2009 | Bean | G06F 40/289 704/9 |
| 2010/0063799 A1* | 3/2010 | Jamieson | G06F 16/36 704/9 |
| 2010/0088262 A1* | 4/2010 | Visel | G06N 3/02 706/18 |
| 2012/0030729 A1 | 2/2012 | Schwartz et al. | |
| 2013/0179386 A1 | 7/2013 | Schindler | |
| 2014/0172417 A1 | 6/2014 | Monk et al. | |
| 2014/0188462 A1* | 7/2014 | Zadeh | G06N 7/005 704/9 |
| 2014/0201126 A1* | 7/2014 | Zadeh | A61B 5/165 706/52 |
| 2014/0297252 A1 | 10/2014 | Prasad et al. | |
| 2015/0066479 A1 | 3/2015 | Pasupalak et al. | |
| 2016/0063993 A1 | 3/2016 | Dolan et al. | |
| 2016/0078339 A1 | 3/2016 | Li et al. | |
| 2016/0148159 A1 | 5/2016 | Coffing | |
| 2016/0180238 A1* | 6/2016 | Alboszta | G06N 3/006 706/46 |
| 2016/0350278 A1 | 12/2016 | Aharoni et al. | |
| 2017/0132207 A1 | 5/2017 | Goldstein et al. | |
| 2017/0232300 A1 | 8/2017 | Tran et al. | |
| 2017/0277993 A1 | 9/2017 | Beaver et al. | |
| 2018/0004718 A1 | 1/2018 | Pappu et al. | |
| 2018/0068358 A1* | 3/2018 | Hoffberg | G07F 17/32 |
| 2018/0083893 A1 | 3/2018 | Viswanathan et al. | |
| 2018/0174020 A1 | 6/2018 | Wu et al. | |
| 2018/0189732 A1 | 7/2018 | Kozloski et al. | |
| 2018/0196796 A1 | 7/2018 | Wu et al. | |
| 2018/0204111 A1* | 7/2018 | Zadeh | G06K 9/3233 |
| 2018/0293224 A1 | 10/2018 | Bostick et al. | |
| 2018/0307673 A1 | 10/2018 | Akkiraju et al. | |
| 2019/0180867 A1 | 6/2019 | Carbonell et al. | |
| 2019/0205381 A1 | 7/2019 | Raux et al. | |
| 2019/0370335 A1* | 12/2019 | Coffing | G06F 40/183 |
| 2019/0392393 A1 | 12/2019 | Coffing | |
| 2020/0073922 A1* | 3/2020 | Coffing | G06F 40/30 |
| 2020/0081987 A1 | 3/2020 | Coffing | |
| 2020/0092301 A1 | 3/2020 | Coffing | |
| 2020/0175961 A1 | 6/2020 | Thomson et al. | |
| 2020/0184278 A1* | 6/2020 | Zadeh | G06F 16/953 |

FOREIGN PATENT DOCUMENTS

| | | |
|---|---|---|
| WO | WO 2019/183144 | 9/2019 |
| WO | WO 2020/051500 | 3/2020 |
| WO | WO 2020/056409 | 3/2020 |
| WO | WO 2020/086155 | 4/2020 |

OTHER PUBLICATIONS

PCT Application No. PCT/US2019/050020 International Search Report and Written Opinion dated Dec. 18, 2019.

PCT Application No. PCT/US2019/051294 International Search Report and Written Opinion dated Jan. 22, 2020.

PCT Application No. PCT/US2019/049390 International Search Report and Written Opinion dated Apr. 8, 2020.

U.S. Appl. No. 16/553,032, Dan Coffing, Computer-Based Method and System of Analyzing, Editing and Improving Content, filed Aug. 27, 2019.

PCT/US19/23034, Processing Natural Language Arguments and Propositions, Mar. 19, 2019.

Katzav et al.; "A Classification System for Arguments", 2012 [retrieved on Aug. 6, 2014] Retrieved from the internet <URL: http://www.arg.dundee.ac.uk/people/chris/publications/2004/ClassifyingArguments.pdf>. Entire document.

Pinto; "The Account of Warrants in Bermejo-Luque's Giving Reasons." 2011. [retrieved on Aug. 6, 2014]. Retrieved from the Internet:<URL: http://www.ehu.es/ojs/index.php/THEORIA/article/viewFile/2950/2634>. Entire document.

Simosi, Maria; Using Toulmin's Framework for the Analysis of Everyday Argumentation: Some Methodological Considerations. 2003. [retrieved on Aug. 6, 2014] Retrieved from the Internet:<URL:http://www.syros.aegean.gr/users/simosi/simosi_webpage_files/toulmin.pdf>. entire document.

Trzesicki, Kazimierz; Arguemnts and their Classification. 2011. [retrieved on Aug. 6, 2014]. Retrieved from the Internet:<URL:http://logika.uwb.edu/pl/studies/download/php?volid=36&artid=kt>. Entire document.

Wyner, Adam; "Multi-Modal Multi-threaded Online Forums", 2009, Google, 9 pages.

PCT Application No. PCT/US2014/031031 International Search Report and Written Opinion dated Aug. 25, 2014.

U.S. Appl. No. 14/897,253 Final Office Action dated Jan. 23, 2019.

U.S. Appl. No. 14/897,253 Office Action dated Feb. 26, 2018.

PCT Application No. PCT/US2014/031031 International Preliminary Report on Patentability dated Sep. 15, 2015; 5 pages.

PCT Application No. PCT/US2019/023034 International Preliminary Report on Patentability dated Sep. 22, 2020; 10 pages.

U.S. Appl. No. 16/559,519 Office Action dated Nov. 16, 2020.

PCT/US1/23034, Processing Natural Language Arguments and Propositions, Mar. 19, 2019.

PCT Application No. PCT/US2019/050020 International Preliminary Report on Patentability dated Mar. 9, 2021; 6 pages.

PCT Application No. PCT/US2019/051294 International Preliminary Report on Patentability dated Mar. 9, 2021; 6 pages.

PCT Application No. PCT/US2019/049390 International Preliminary Report on Patentability dated Mar. 2, 2021; 4 pages.

U.S. Appl. No. 16/553,032 Office Action dated Mar. 29, 2021.

U.S. Appl. No. 16/563,461 Office Action dated Mar. 12, 2021.

* cited by examiner

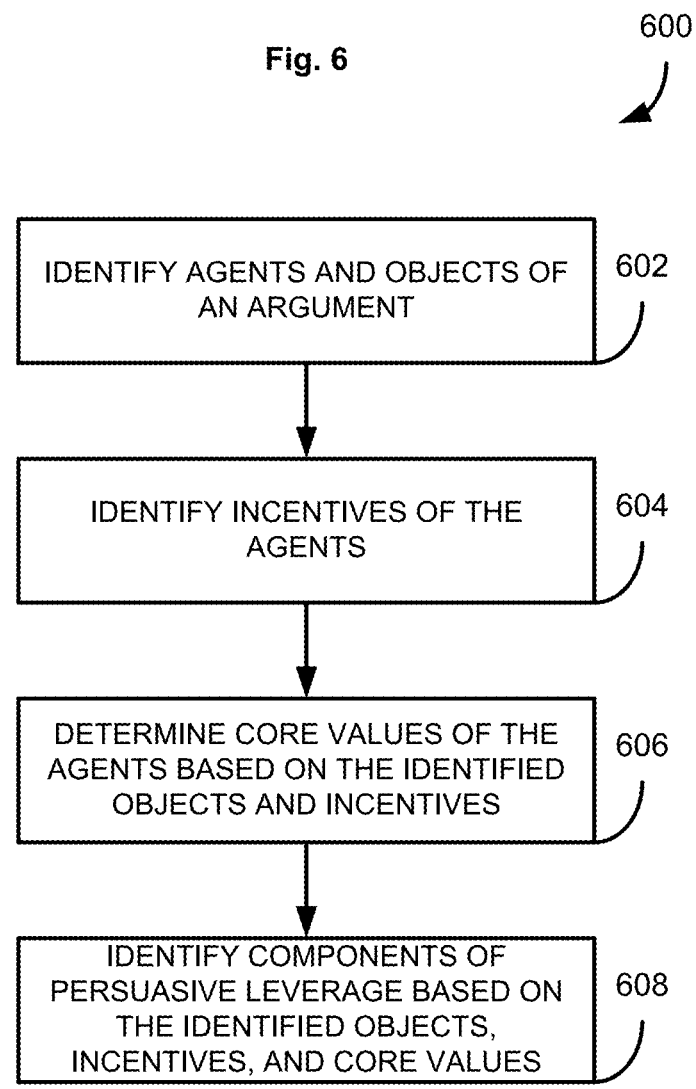

Fig. 7

"He wants to bar them from entering the US. Tourists. Businessmen. Immigrants. Orphans. Anyone. He wants to create a database. It's basically a war criminal's program. Round them up. Export them. Monitor those that remain. Exclude them from daily life. Stigmatize them."

All Politicians are Liars.
All Politicians in 2020 are Liars.
All National Politicians in 2020 are Liars.
Al National Party A Politicians are Liars.
All National Party A Congressman are Liars.
All National Party A Presidential Candidates are Liars.
All National Party A Presidential Candidates are Paranoid.
All National Party A Presidential Candidates in 2020 are Paranoid.
Most National Party A Presidential Candidates in 2020 are Paranoid.
Candidate X, the 2020 Party A Presidential Candidate is Paranoid.
Candidate X, the 2020 Party A Presidential Candidate sounds Paranoid.

Fig. 8

"It's basically a war criminal's program. Round them up. Export them. Monitor those that remain. Exclude them from daily life. Stigmatize them."

- Fact being contradicted
- Category mismatch
- Principle being violated
- Solution being proposed
- Consequence being asserted (good or bad)
- Outcome different from intent
- Topic shift or splitting
- Analogy of attributes
- Non-sequitur
- Questions of degree
- Confusion of subject agency or the affected parties
- Assignment of burden of proof
- Question begging
- Counter example from opponents value system (ie contradiction in thought)
- Set is incomplete (counter example that shows the list is incomplete)

Fig. 9   900

"It's basically a war criminal's program. Round them up. Export them. Monitor those that remain. Exclude them from daily life. Stigmatize them." — 802

Analogy of Attributes: Candidate X:Group 1::war criminal:Group 2   — 902, 906

| Properties in Common | Properties that are Different |
|---|---|
| Identification based on Religion | Identification based on Ethnicity |
| Exclusion based on alleged harm | Thesis of Ethnic superiority/inferiority |
| Message rooted in "a national good" | Policy proposal versus enacted war crimes |
| Early messaging stage is to identify | |
| Both groups operate in a sub-culture | |

904

PROCESSING NATURAL LANGUAGE ARGUMENTS AND PROPOSITIONS

CROSS-REFERENCE TO RELATED APPLICATIONS

The present patent application claims the priority benefit of U.S. provisional patent application No. 62/645,114 filed Mar. 19, 2018, the disclosure of which is incorporated by reference herein.

BACKGROUND OF THE INVENTION

1. Field of the Invention

The present invention relates to processing natural language content to identify semantic components of argumentation and rhetoric.

2. Description of the Related Art

Humans constantly engage in persuasive discourse across various media of interaction. It is often the case that parties engaged in persuasive discourse are unaware of the internal motivations of other parties participating in the discourse. In many cases, a party may not even be entirely aware of their own internal motivations. Such lack of awareness of baseline motivations may cause participants to "talk past each other," which may thus greatly reduce the efficiency of communication. Further, as discourse unfolds and iterates, this "talking past each other" can cause incorrect or misleading information to be entered into the conversation, which may thus cause further confusion and "noise" in the sphere of the discourse and which may be exacerbated in where the discourse is a public discourse.

Furthermore, parties often put forth arguments that are not fully or directly supported by the claimed premises and logic, either intentionally or accidentally. Arguments may also hold up to light or surface level scrutiny but may still fail upon a thorough and tedious inspection of the validity of the supporting propositions or premises. However, even when incentivized, individual community members must spend considerable time manually reviewing support for arguments, or lack thereof, and this review is often prone to errors, inconsistencies, and incompleteness.

There is, therefore, a need in the art for improved systems and methods of processing natural language arguments and propositions.

BRIEF DESCRIPTION OF THE DRAWINGS

FIG. 6 is a flowchart illustrating a method for identifying components of persuasive leverage in accordance with various embodiments of the subject technology;

FIG. 7 is an illustration of an interface depicting a neutral language proposition taxonomy in accordance with various embodiments of the subject technology;

FIG. 8 is an illustration of an interface depicting argument tags in accordance with various embodiments of the subject technology;

FIG. 9 is an illustration of an interface depicting an argument form in accordance with various embodiments of the subject technology;

DETAILED DESCRIPTION

Figure 1:
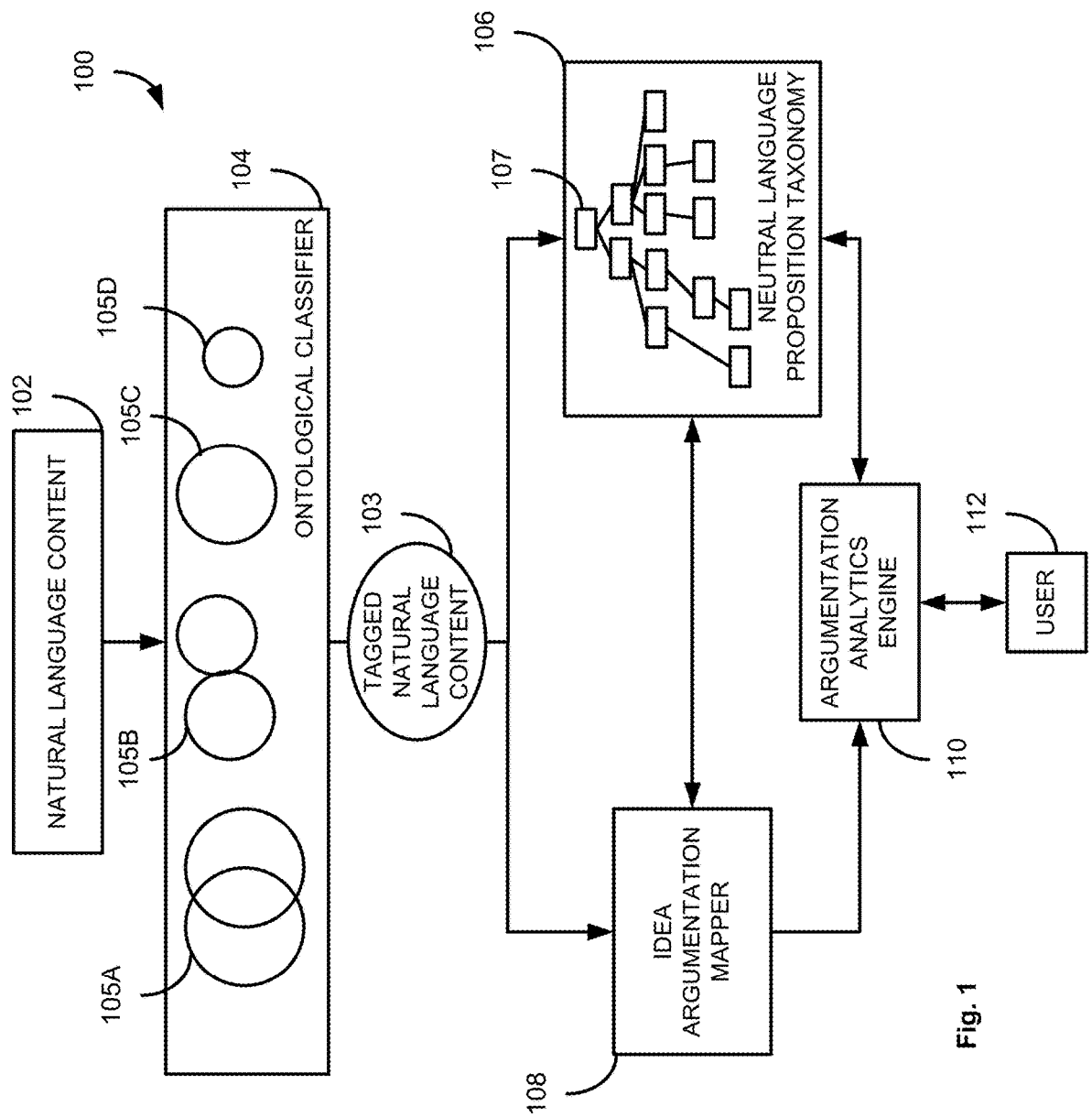
FIG. 1 is a system diagram illustrating a system for processing natural language content in accordance with various embodiments of the subject technology.

Aspects of the present disclosure involve systems and methods for extracting information of multiple levels of abstraction and informational distance from natural language. The extracted information can then be reviewed and verified by users, be used to train artificial intelligence (AI) systems (e.g., involving machine learning models and/or rules-based learning), and be incorporated into a user interface for display.

Natural language content can be provided by multiple and various sources. For example, natural language content may be provided in an audio format (e.g., over a broadcast, stream, or recording) and then processed into a text format, which may provided to various systems for further processing as described herein. In other examples, a user may directly provide natural language text to a user device (e.g., through an input device, widget, other browser utility, or as a text document).

Further, a user may provide to the system the natural language content of a third party in order to review or map the semantic content of the third party's natural language content. For example, a participant of a debate on an online discussion forum can highlight a selection of text included in a post by another participant and by using a tool such as a browser widget, may map the argumentation of the post. Argumentation may include propositions, chain of reasoning, logical elements, sub-propositions, and proponent motivations, which may be implicitly or explicitly included in a party's statements. The mapped argument may be displayed to the user, and the user may provide additional propositions to explore hypothetical responses to the expanded mapped argument. Further, the chain of reasoning can be displayed for the user, so that sub-propositions that are inherent to the truthfulness of a proposition can be identified, reviewed, and similarly explored (e.g., sub-propositions of sub-propositions and so on). In other words, a stack of propositions underlying a stated proposition can be revealed.

Arguments may be mapped using ontologies related to various domains in order to efficiently tag arguments, organize propositions, determine rules related to the relationship between propositions, and determine rules for resolving arguments. The domains can include generalized "problem spaces" (e.g., abstracted concepts related to groupings of problem types), professional specialties, syntactical elements, reasoning or logic elements, and the like. Each ontology may include a hierarchical definition of entities and/or objects and their relationships within the particular domain space. Ontologies can be probabilistically determined, defined by a rules-based process, or a mix of the two.

For example, and without imputing limitation, words from a natural language content may be mapped along a multi-dimensional vector, as well as based on a coordinate value within a particular semantic space. Each dimension or axis can then be related to a particular abstraction (such as ownership, occupation, field of work, etc.), which may be used to place the mapped word or words into a mapped space. Clustering, distance between words, topographies, topologies, and the like can be used to identify particular groupings and to identify a word or words as related to particular concepts. In other examples, ontologies can be defined using specified rules, such as keyword or word grouping identification. If a particular word or sequence of words is observed (e.g., via string matching and the like), the word, sequence of words, segment of text, or natural language content in which they were identified can be tagged according to a predetermined mapping.

The ontologies may further be used to define relationships between propositions and arguments, so that the arguments and relationships may be placed within an idea and/or argument map ("IAM"). The IAM can be used to further process the natural language content, provide a visualization of the flow of ideas and/or arguments contained within the natural language content, or perform simulations of various hypothetical responses or expansions of the contained ideas or arguments. In some examples, a user may define concepts and relations for mapping. The user may then be presented with suggestions for further concept and relation definitions (e.g., based on a model informed by historical selections, the user, and/or a global history). Further, the informed model may be updated in response to the how the user utilizes the suggestions.

An argument analysis tool can further use the IAM to provide insights based on the mapped propositions and/or sentences using one or more rules. Demonstrative arguments may be analyzed to identify and verify explicit propositions, as well as implicit or necessary sub-propositions that may support or invalidate the explicit propositions of the analyzed argument. Analysis may be provided by a first-order logic engine that examines the truth of propositions or may be performed by a higher-order or non-classical logic engine that processes and analyzes the relationships between propositions and relationships between relationships (e.g., interdependency between two particular propositions may be reliant upon another interdependency between two other propositions). In some examples, graph-based analysis may identify various characteristics of an argument (e.g., circular reasoning as indicated by cycles and the like). In other examples, Bayesian and/or Markov-based probabilistic analysis may place argument components, and complete arguments along a spectrum of likelihood based on identified probabilities of explicit and implicit propositions.

A Neutral Language Proposition Taxonomy ("NLPT") may include a taxonomy in the form of a tree data structure where each node of the tree represents a neutral language proposition or topic in increasing definition or specificity. In some examples, the NLPT can be displayed as embedded hashtags or hyperlinks interconnecting nodes. The NLPT can use the ontologies to identify propositions within a natural language content input provided directly by an author of the content or by a third party reviewing the content. The NLPT may be used to associate propositions in a set of natural language content with comparable emotionally-neutral propositions from within the taxonomy. In other words, the NLPT can be used to neutralize the rhetoric of argumentation (e.g., by removing invectives, judgmental adverbs, exaggeration, and the like), which may otherwise obfuscate the propositional content of a statement with emotive qualifiers unrelated to the truth value of the proposition under consideration. Such neutralization may be achieved by associating the natural language content with a selection of more neutral propositions expressing a similar thought.

In some examples, the NLPT can operate in real-time, continuously processing text as it is written (e.g., via a browser widget, word processor plug-in, individually executable software, and the like). Having identified a proposition, the NLPT may then identify a node within the taxonomy tree of the NLPT that corresponds to a similar proposition. In some examples, the NLPT may prompt the user to verify that the identified topic is correct, or the user may provide their own topic, which may then be inserted into the tree nearby the nodes (e.g., topics) identified by the NLPT. This way, the tree may expand and/or increase in accuracy, while simultaneously providing a taxonomic overview of natural language content input to users. Further, the NLPT may group non-neutral language under comparable neutral language nodes, thus providing navigation between similarly-grouped propositional content and insights into community trends in a manner similar to that of "hashtags" and other such concepts. In some examples, such prompting functions may be performed before the drafter has published to the audience or as part of a review performed by users or the system after publication.

Having identified nodes within the tree based on the natural language content input, a system including the NLPT may prompt a user to identify arguments being made in relation to the propositions. In some examples, the IAM can identify the arguments and ask a user to validate the identified arguments. The IAM may improve its argument identification based on user validation or lack thereof, which may further be used to refine future performance of argument identification. Argument types may include, without imputing limitation, fact being contradicted, argument by analogy, category mismatch, principle being violated, solution being proposed, consequence being asserted (and a normative evaluation of that consequence), outcome different from intent, topic shift or splitting, non-sequitur, questions of degree, confusion of subject agency or the affected parties, assignment of burden of proof, question begging (e.g., using a premise to support itself or circular reasoning), contradiction, and incompleteness of a set.

In some examples, the system may prompt a user to provide further elements and propositions to complete an otherwise incomplete argument based on the identified arguments. For example, where a natural language text input is identified as an argument by analogy, the system may process the subjects being analogized and provide the user a listing of similarities and dissimilarities between the analogized subjects. Such analysis may make use of various databases and information sources available over a communication network. Where different information sources may provide different information, some sources may be prioritized based on such factors as history of validation, preference, timeframe of the information, direct/indirect sourcing, etc.

The NLPT can also identify proposition interrelationships for the user by providing a sequence of identified propositions. The sequence may be a representation of the identified nodes of the taxonomy tree. A relative placement of individual propositions may further be provided by the NLPT.

For example, a dropdown list of a hierarchy of propositions can be provided to the user where each entry on the list represents related propositions (e.g., within a particular traversal distance or direction of the identified proposition). The proposition identified by the NLPT may be highlighted or otherwise marked within the dropdown list. In some examples, the user may select nearby propositions, and the system may identify differentiating elements (e.g., a route of traversal) between the selected proposition and the currently-identified proposition. Further, elements may be recommended to traverse the difference and thus assist the user in providing a more robust support for their intended argument or to identify gaps between an opponent's stated position and the propositions put forth in support of that position.

Hyperbolic or incendiary components of an entered proposition may be removed from the natural language content upon associating the content with a node of the NLPT and that node's associated neutral language (e.g., as compared to the language provided by the user). Hyperbolic or incendiary components can be identified by, for example, a sentiment analysis engine or the like (not depicted). As language is drafted, the system may identify and highlight hyperbolic or incendiary components for the drafter in order to allow the drafter to minimize (or, if preferred, maximize) the emotive elements of an argument.

FIG. 1 depicts a system 100 for processing natural language content 102 to provide an argumentation and proposition analysis output to a user 112 (by way of a user device). The user 112 can view the output through a user interface, which may be provided in a computer, mobile device, smartphone, laptop, and the like. In some examples, the user 112 can interact directly with the system 100 through the user interface and may provide the natural language content 102 as text, audio, or video data.

The natural language content 102 is first received by an ontological classifier 104. The ontological classifier 104 can include domain-specific ontologies related to professional domains, social domains, political domains, cultural domains, and the like. In some example, the ontological classifier 104 may be one or more trained models. In other examples, the ontological classifier 104 can be one or more rules-based systems or a mixed system for identity-specific ontologies and/or ontology types. Further, the ontological classifier 104 can include overlapping domain ontologies 105A, joint domain ontologies 105B, or domain ontologies of varying sizes 105C-D. The ontological classifier 104 processes the natural language content 102 and provide abstracted conceptual information, such as propositions and arguments that are associated with various portions of the natural language content 102. Different portions of the natural language content 102 can therefore be tagged and provided as tagged natural language content 103 (tagged to identify portions of abstracted conceptual information), before being provided to a neutral language proposition taxonomy 106 and an idea argumentation mapper 108.

The neutral language proposition taxonomy 106 may include a hierarchical organization of propositions. Here, the neutral language proposition taxonomy 106 includes a taxonomy tree 107. In some examples, the neutral language proposition taxonomy 106 can instead or also include other graph types, lists, semantic spaces, and the like. In some examples, the neutral language proposition taxonomy 106 can be domain-specific and may vary based on which domain-specific ontology of the ontological classifier 104 used to process the natural language content. The tagged natural language content 103 can be mapped within the neutral language proposition taxonomy 106 (e.g., to the taxonomy tree 107) in order to identify nearby propositions, as well as identify distance between identified propositions and unidentified propositions that may be located between identified propositions within the proposition hierarchy.

The idea argumentation mapper 108 can use the tagged natural language content 103 to generate a mapping of the tagged natural language content 103 representing arguments contained within it. Further, the idea argumentation mapper 108 may receive taxonomy information from the neutral language proposition taxonomy 106 to identify arguments and in some examples, strength of the arguments based on identified propositions and relationships between the propositions (e.g., distance or intervening propositions and the like).

Distances, intervening propositions, depth of a proposition within the neutral language proposition taxonomy 106, and other information—along with the mapping generated by the idea argumentation mapper 108—can be provided to an argumentation analytics engine 110. The argumentation analytics engine 110 can receive feedback from the user 112, which may include informing or validating the output of the neutral language proposition taxonomy 106 or the idea argumentation mapper 108. In some examples, the user 112 can provide hypothetical responses to the analytic engine 110 in order to explore potential argument rebuttals or supports. Similarly, the argumentation analytics engine 110 may use input from the user 112 to update the map generated by the idea argumentation mapper 108, the neutral language proposition taxonomy 106, or the ontological classifier 104.

Figure 2:
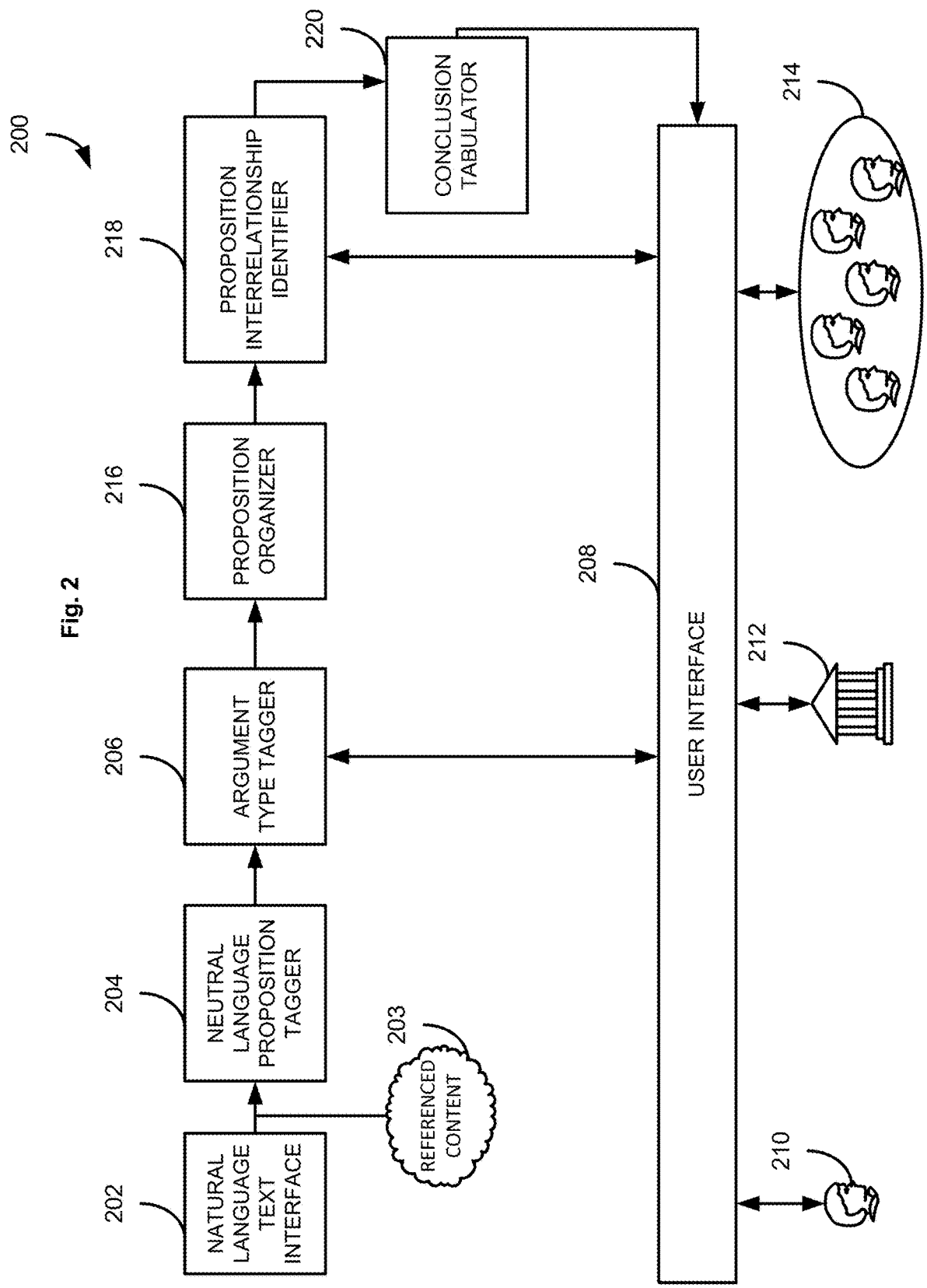
FIG. 2 is a system diagram illustrating a system for processing natural language content in accordance with various embodiments of the subject technology.
Figure 3:
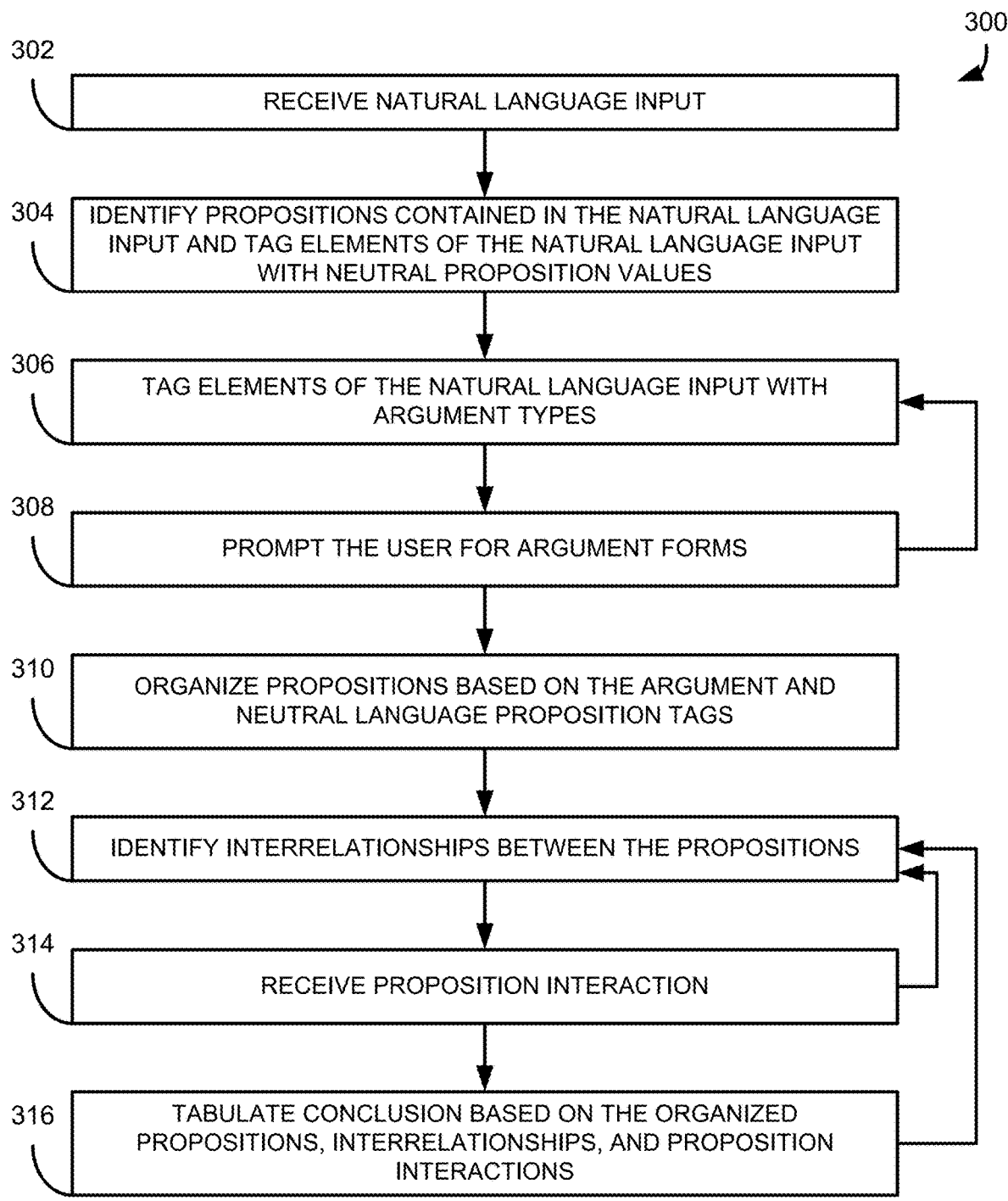
FIG. 3 is a flowchart illustrating a method for processing content in accordance with various embodiments of the subject technology.

FIG. 2 illustrates a content processing system 200, and FIG. 3 illustrates a content processing method 300. The content processing system 200 can receive natural language content in various forms, which may be processed differently. Source content can include, without limitation, a "simple comment," a "compound comment," an "online article," "print," "recorded speech," and "live speech." Where the submitted natural language content is in non-text form (e.g., in the case of recorded speech or images), such content may first be processed by a speech-to-text or optical character recognition ("OCR") system (not depicted) in order to provide text data. In some examples, preprocessed data may include metadata associated with various contextual elements of the natural language content, such as speaker posture, vocal intonation, surrounding environment, and the like.

A natural language text interface 202 receives the natural language content (operation 302). The natural language text interface 202 can be a "drag-and-drop" interface, which receives a text file, a browser widget, or a separate software process running, for example, as a background operation. The natural language text interface 202 may provide the natural language content to a neutral language proposition tagger 204. Referenced content 203 may also or instead be provided to the neutral language proposition tagger 204. For example, a hyperlink can be provided to the system 200 in lieu of a direct text document, and the system may process the natural language content of the referenced content 203.

The neutral language proposition tagger 204 can identify propositions within the received natural language content and tag them with neutral proposition values (operation 304). In some examples, when the natural language content is a simple comment or compound comment, a proposition and propositions may respectively be tagged to the entirety of the simple comment or compound comment. Where the natural language content is provided via referenced content 203 (e.g., an online article, print, recorded speech, or live speech), the neutral language proposition tagger 204 may tag the content with inline propositions throughout the natural language content.

Having tagged the natural language content, the neutral language proposition tagger 204 can send the tagged natural language content to an argument type tagger 206. The argument type tagger 206 may tag elements of the natural language content with argument types (operation 306). In some examples, such as when the system 200 receives an image as referenced data 203, the natural language content may be passed without proposition tags and may only tag the image content with an argument type.

The argument type tagger 206 may prompt a user 210 (through a user interface 208), a system curator 212, or a community 214 for inputs specifying argument forms of the natural language content (operation 308). Argument forms may be arguments intended by the user and so the user may verify the application of their intended argument by inputting it to the type tagger. In some examples, the system curator 212 or community 214 may provide argument forms observed in the natural language content. Multiple argument forms can be provided, and the argument type tagger 206 can further tag elements of the natural language content with argument types as new forms are provided and before providing the fully tagged natural language content to a proposition organizer 216. In some examples, users 210, system curators 212, or communities 214 can credential or otherwise authorize another one or more other users 210, system curators 212, or other communities 214 to interact with the system 200 on their behalf. Communities 214 can use various systems, such as community member voting to authorize or credential other communities 214, system curators 212, or users 210. For example, a first user 210 may authorize a colleague (e.g., another user 210) to provide propositions in support of or contrary to arguments provided by the first user. Community-sourced inspection (e.g., by credentialed entities) may be incentivized to provide increased scrutiny to topics, for example as disclosed by U.S. Pub. No. 2016/0148159 which is hereby incorporated by reference in its entirety.

As depicted in FIG. 8, the user interface 208 can display the argument form or forms identified by the argument type tagger 206 via a user display 800. The user display 800 can include a set of natural language content 802 and an associated argument form 806 among a list of arguments 804. In some examples, different arguments can be selected or provided entirely by a user.

Returning to FIG. 2, the proposition organizer 216 organizes propositions based on the argument and neutral language proposition tags into argument abstractions (operation 310). Depending on the type of source content, the proposition organizer 216 may generate different argument abstractions. In the case of a simple comment, a single proposition may be identified, the argument abstraction may be the tagged proposition, and in some cases, related propositions that are not explicitly included with the natural language content may also be identified. A compound comment may result in an argument abstraction including multiple propositions. Online articles, print, recorded speeches, and live speeches may result in argument abstractions including proposition maps that may include interconnected propositions.

A proposition interrelationship identifier 218 may identify interrelationships between the organized propositions provided by the proposition organizer 216 (operation 312). Proposition interrelationships may describe how propositions support or refute each other. In some cases, the users 210, the system curator 212, or the community 214 can interact with the propositions via the user interface 208 (operation 314). As proposition interactions are received, the proposition interrelationship identifier 218 can update how interrelationships are identified or record new interrelationships before receiving further proposition interactions. In this way, multiple users can interact with propositions in an effort to support or refute a proposition identified in a natural language input.

A conclusion tabulator 220 can tabulate a conclusion based on the organized propositions, interrelationships, and proposition interactions (operation 316). The conclusion tabulator 220 can provide requested or real-time updates to users via the user interface 208. For example, where multiple users 210 or a community of users 214 interact with the proposition interrelationship identifier 218, a running conclusion tabulation may be provided over the user interface 208 so users can see the success or failure of their interactions in real-time. In some examples, the conclusion tabulator 220 traverses a chain of reasoning to tabulate conclusions of sub-propositions as well. This traversal can be iterative, recursive, or otherwise as will be apparent to one skilled in the art. Further, variations on sub-propositions may be explored by users adjusting sub-propositions within the chain of reasoning. The interrelationships and sub-propositions may be further determined or modulated by domain-specific rules and the like. Furthermore, in some examples, the interrelationships or truth values of propositions may be probabilistic (e.g., likely or unlikely to be true rather than strictly true or untrue). A proposition being true or untrue may increase the likelihood of another proposition being true or untrue. Thus, the conclusion tabulator 220 may provide multiple conclusions of varying likelihood based on the likelihoods of individual propositions and/or probabilistic interrelationships between true or false propositions. The results of the conclusion tabulator 220 can also feed into other services, such as other conclusion tabulators (e.g., a recursive or iterative exploration of a chain of reasoning), reporting services, or other decision-making type services, and the like.

Figure 4:
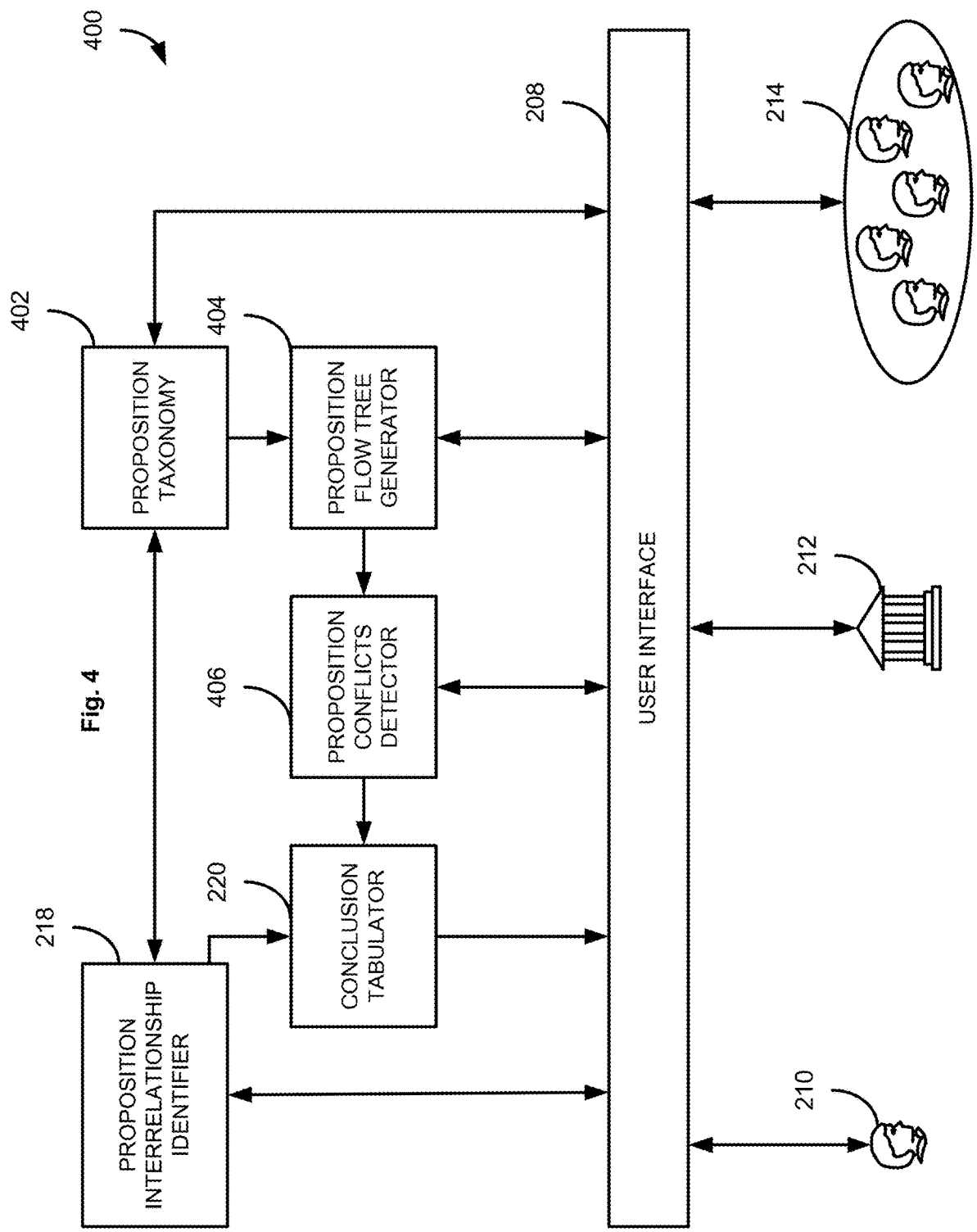
FIG. 4 is a system diagram illustrating a system for processing natural language content in accordance with various embodiments of the subject technology.
Figure 5:
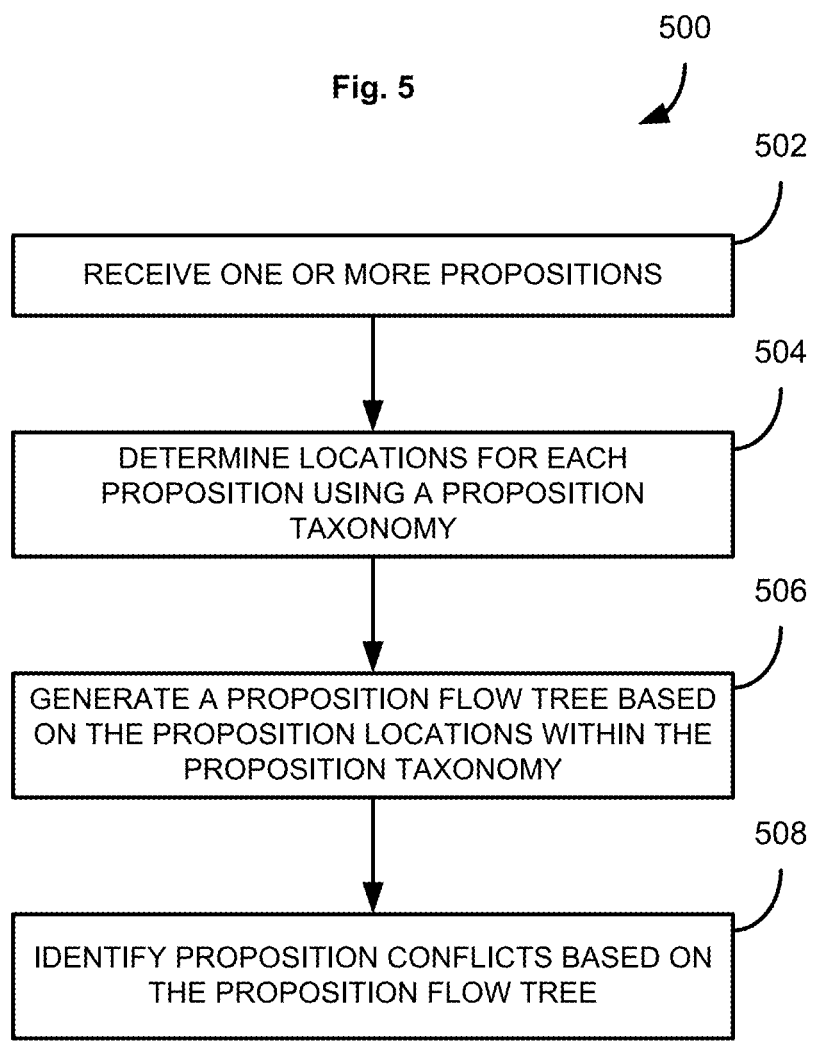
FIG. 5 is a flowchart illustrating a method for identifying conflicting propositions in accordance with various embodiments of the subject technology.

FIGS. 4 and 5 respectively depict an extended system 400 and method 500 for processing multiple propositions. The system 400 can identify propositions that may be implicitly imputed by a proposition or propositions explicitly or specifically stated in a set of natural language content. For example, a proposition describing a politician may imply one or more suppositions underlying the proposition where the suppositions are themselves propositions. Further, these implicit propositions may themselves further include implicit propositions, and so the extended system 400 allows users to repeatedly drill down through a hierarchy of propositions and identify supporting propositions and/or negating propositions.

A proposition taxonomy 402—which may include an NLPT such as that discussed above in reference the NLPT 106—may receive one or more interrelated propositions from the proposition interrelationship identifier 218 (operation 502). Further, the proposition taxonomy 402 may provide new proposition interrelationships to the proposition interrelationship identifier 218.

In some examples, the proposition taxonomy 402 can provide the updated propositions to users via the user interface 208. Users can likewise use the interface 208 to provide feedback or further information to the proposition taxonomy 402. For example, new propositions may be provided and directly placed within the NLPT used by the proposition taxonomy 402, thus defining the interrelationships between the new propositions and various other propositions previously already in the NLPT. Users may also remove propositions and/or update the interrelationships between propositions.

The proposition taxonomy 402 determines the locations for each received proposition using a proposition taxonomy, such as the NLPT (operation 504). The taxonomy itself can be of any construction containing a hierarchical organization. For example, graphs, trees, sets, lists, and the like may be used by the proposition taxonomy 402.

In some examples, proposition locations within the proposition taxonomy 402 can be displayed through the user interface 208 to one or more users. The displayed locations may be provided as a mapping of natural language content to neutral language contained within the proposition taxonomy 402 (e.g., neutral language contained within nodes of a NLPT of the proposition taxonomy 402 as discussed above) in order to review a third party argument in neutral terms, review the user's own argument in neutralized terms, or both. Further, in the case of a discourse, locations of each participant's language within the proposition taxonomy 402 can be identified as to overlaps and divergences between the two participants' mapped natural language content (e.g., their locations within the proposition taxonomy 402) can be provided to users through the user interface 208 in visual form (e.g., flow-charts, bands, bar graphs, Venn diagrams, and the like).

In another example, a series of interchanges, such as throughout a discourse or argument between multiple parties, can be monitored by the system 400 to identify divergent term usage. For example, a proposition taxonomy 402 may either explicitly or otherwise identifies a first proposition as "all," a first response to the first proposition as "most," and a second response as "some." The diverging propositions can be identified, and users may be alerted in order to ensure all participants are "on the same page" or discussing the same concepts. In other words, the system 400 may measure a vocabulary alignment between multiple users. In some examples, a vocabulary alignment (or lack thereof) over a sequence of natural language content may identify a drift or shifting of propositions.

A proposition flow tree generator 404 can generate a proposition flow tree based on the proposition locations within the proposition taxonomy 402 (operation 506). The generated flow tree may be of different constructions, depending on the data structure used to store the proposition taxonomy. Notwithstanding, the generated flow tree may provide a mapping of propositions through the proposition hierarchy. In some cases, multiple flow trees may be generated based on factors as forking proposition interrelationships within the proposition taxonomy (e.g., as in the case of a graph where each proposition is represented by a node and connections between propositions are represented as edges connecting nodes).

The flow tree generated by the proposition flow tree generator 404 may be provided to users via the user interface 208. In some cases, users may explore or interact with the proposition flow tree through the user interface 208. For example, a user 210 may validate a proposition flow along a particular branch of the flow tree or may update the flow tree with a new proposition flow. In some cases, new propositions may be exposed within the proposition taxonomy 402, which may then be further mapped by the proposition flow tree generator 404.

FIG. 7 depicts a user view 700 that includes a visualization of the proposition flow tree. Here, the flow tree is visualized by a dropdown tab 704. Each line included in the tab 704 indicates a proposition within the proposition taxonomy 402. At the top of the tab 704, the topmost proposition 705 is semantically broad, encompassing all politicians. In contrast, the last line 706 of the tab 704 is narrower or more specified, indicating a particular politician of a particular type of a particular affiliation and/or exhibiting a particular quality.

Further, the user view 700 includes a display of the processed natural language content 702. Here, the proposition flow along a particular branch is displayed; however, multiple proposition flows can be displayed (not depicted). In some examples, multiple proposition flows may be displayed adjacent to each other or through a tabbed display menu. In some examples, the display may include a graphical element depicting proposition interrelationships.

Returning to FIG. 4, the proposition flow tree generator 404 may also provide the proposition flow tree to a proposition conflicts detector 406 in order to identify proposition conflicts based on the flow tree (operation 508). Conflict detection algorithms may vary based on the data structure used by the proposition taxonomy 402. For example, a circuit within a directional graph may identify circular reasoning based on the proposition interrelationships (e.g., edges between nodes representing propositions). The proposition conflicts detector 406 may receive input from users through the user interface 208, and users may notified by the propositions conflicts detector 406 with new conflicts. In such cases, the proposition taxonomy 402 may also be updated to further include user-identified proposition conflicts.

FIG. 9 depicts an argument analysis visualization 900 that displays proposition conflicts associated with a tagged argument. The proposition conflicts detector 406, the argument type tagger 206, the proposition taxonomy 402, or a combination of the three can provide the argument 902, which includes the argument type tagged to the proposition under consideration 802.

Particular propositional components of the argument type as applied may be extracted and displayed for the user. Here, the "analogy of attributes" argument tag has been identified and applied to the propositions included in the argument 902. Because arguments by analogy of attributes rely on similar attributes, a column depicting properties (e.g., attributes) in common 904 between the analogized subjects can be juxtaposed with a column depicting attributes that are different from each other. In some examples, these columns may be filled in by users 210, the system curator 212, or the community 214. In other examples, the taxonomies specific to the propositions of the argument can be used to fill in the column based on proposition interrelationships within each taxonomy. Further, the columns may be automatically filled-in by the system and can improve as more humans provide column entries (e.g., such as propositions associated with entities identified in the argument 902) upon which the system may train itself.

Figure 10:
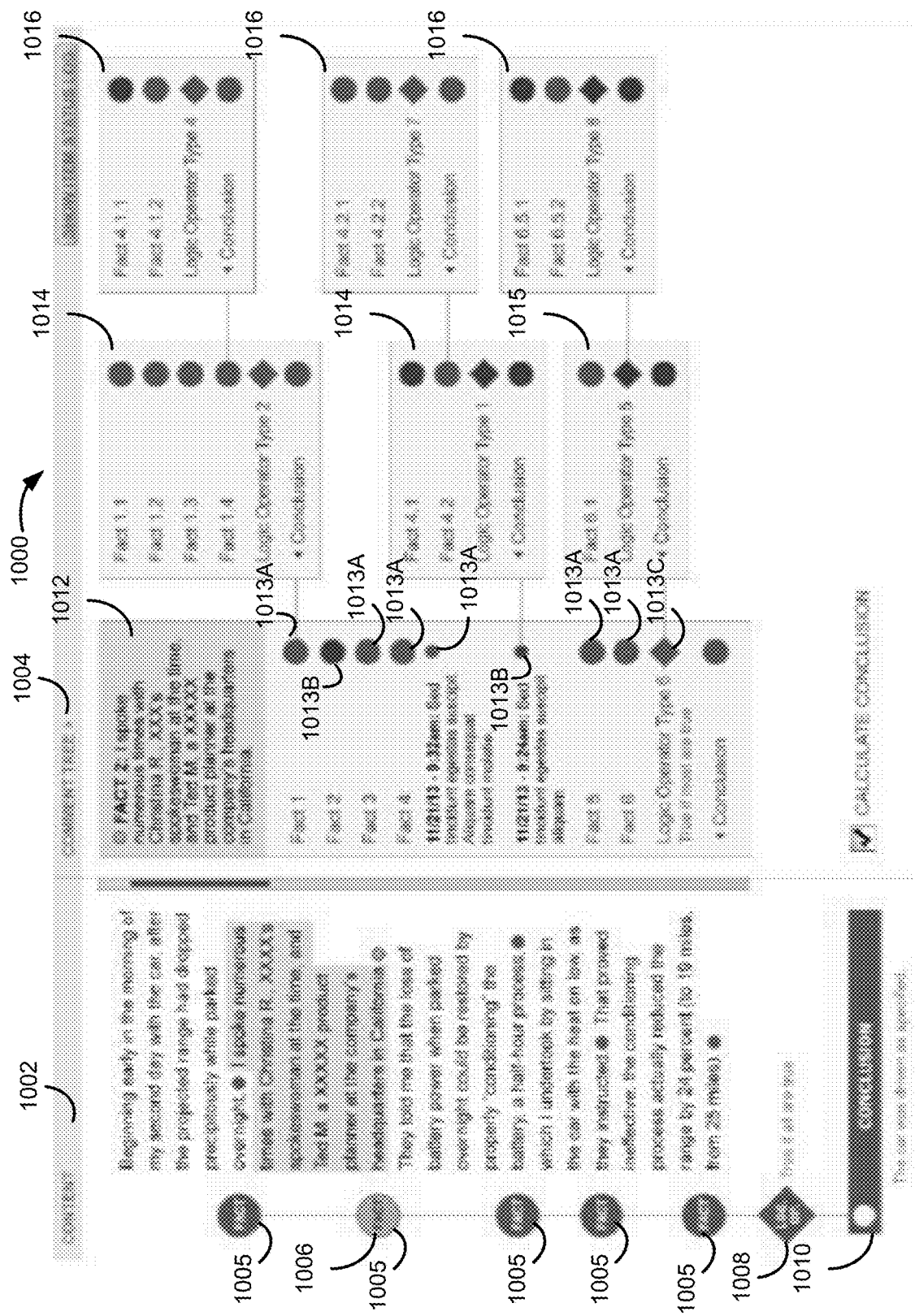
FIG. 10 is an illustration of an interface depicting a proposition flow tree in accordance with various embodiments of the subject technology.

FIG. 10 depicts a visualization 1000 of a proposition flow tree provided to the user interface 208. The original natural language content 1002 is displayed in a scrollable column and includes proposition tags 1005 as well as an argument tag 1008. Further, a conclusion button 1010 allows a user to manually activate the conclusion tabulator 220.

A comment tree section 1004 details the proposition flow tree associated with a selected proposition. Here, the selected proposition 1006 is highlighted both within the natural language content 1002 and in the comment tree section 1004, where it acts as the root node 1012 of the comment tree. Propositions 1013A-B associated with the selected proposition 1006 are listed below the root node 1012. Propositions 1013A-B are associated with the root node 1012 based on their relative locations within the proposition taxonomy 402.

Each depending proposition 1013A-B is evaluated as either a supporting proposition 1013A or a negating proposition 1013B. Furthermore, depending propositions 1013A-B may each include depending proposition trees 1014 of their own. In turn, propositions included within depending proposition trees 1014 may similarly include further depending proposition trees 1016 of their own and so on. Depending proposition trees 1014, 1016, and so on—in combination with the root node 1012 and its associated depending propositions 1013A-B—make up the proposition flow tree displayed in the comment tree 1004. Each proposition tree includes a logic operator 1013C, which aggregates the propositions in the tree and their interrelationships to determine a validity of the associated root proposition.

In some examples, the logic operator 1013C may include a depending proposition tree 1015 that itself includes a logic operator (which may also include a depending tree with a logic operator, and so on). The depending proposition tree 1015 may include pre-requisite premises necessary for successful tabulation by the logic operator 1013C. In some examples, ontologies and other systems can identify the pre-requisite premises. In other examples, a user (e.g., the creator of the natural language content or a user reviewing another's natural language content) may be prompted to provide any pre-requisite premises necessary for tabulation.

In some examples, the comment tree 1004 can depict or otherwise flag a burden of proof related to particular propositions 1013A-B or propositions included in the depending proposition trees 1014 and 1016. The burden of proof may include a measure of distance between a proposition and an opposed proposition within the proposition taxonomy 402. Where an opposed proposition is less often indicated in natural language content than the current proposition, for example, the burden of proof (and a notice indicating it) may be shifted to advocates of the opposed proposition.

FIG. 6 depicts a method 600 that may be performed by the argumentation analytics engine 110 to further provide argument analyses to the user 112. The argumentation analytics engine 110 may identify agents and objects of an argument (operation 602). Agents include the actors or active participant in a causal argument. For example, an argument espousing the negligence of a particular community may identify particular member of that community whose actions had a deleterious effect on others inside and outside the community. Those impacted may be identified as objects of an argument. In some examples, the objects in a causal argument may become agents in a subsequent round of causal effects (e.g., in response to the agent).

In some examples, the argumentation analytics engine 110 may identify an author of the content itself as the agent (e.g., an author opining about what he himself should do). In this case, the very act of writing may inform latter operations of method 600. Further, the agent or those responding to the content written by the agent may use the argumentation analytics engine 110 to process the natural language content of the agent.

In some cases, intended audiences of the causal argument may be identified as well. An argument can be intended to persuade agents, objects, third parties, or various combinations of the three. For example, an agent and/or object may be targeted by the argument for castigation while third party opinions toward the agent and/or object are intended to be lowered.

The argumentation analytics engine 110 may then identify the incentives of the agents (operation 604). Incentives may be identified automatically by the argumentation analytics engine 110 or may be provided by the user 112. For example, the argumentation analytics engine 110 may identify incentives based on an agent's behavior within the argument, based on the agent's historical behavior, or both.

The argumentation analytics engine 110 can identify core values of the agents based on the identified objects and incentives (operation 606). Further, the core values of the agents may denote value conflicts between the agents, the objects, and/or the audience. In some cases, a value conflict may indicate a fundamental emotional trade-off of a situation and may be unresolvable. However, the identified value conflict may provide an indication of propositions to avoid and/or seek based on the intent of a party to an argument. In some examples, the core values can include subjective valuations, such as aesthetic opinions or preferences that are not premised upon sub-propositions or a chain of reasoning and are thus irrefutable or axiomatic. Further, in some cases, an agent's use of the method 600 may itself inform the identification of core values of that agent. In other examples, the argumentation analytics engine 110 may learn to identify the core values of an agent based on the agent's repeated interaction with the system. In other examples, the system itself may directly interact or query the agent (e.g., where the agent is also a generator of the natural language content).

Further, the argumentation analytics engine 110 may identify components of persuasive leverage based on the identified objects, incentives, and core values (operation 608). Components of persuasive leverage may include anecdotes, evidence, and logical constructs which can be provided directly to the user 112. In some examples, the components of persuasive leverage may be used to inform the neutral language proposition taxonomy or applied to it as an added filter in order to generate propositional taxonomies reflective of agent, object, or audience-specific characteristics. The components of persuasive leverage may be included as a data field or structure for other downstream processes, such as training a system model or ontology, rendering to the user, or for other processing and the like.

Further, the incentives, core values, or components of persuasive leverage may individually or together inform the idea argumentation mapper 108 of relationships between propositions and the like. In other examples, where axiomatic core values are identified, the value can be a terminal endpoint within the neutral language proposition taxonomy. In other words, because the proposition is presumed true by the agent, the proposition may itself only be a proposition for other propositions and will not include sub-propositions informing it (e.g., during conclusion tabulation). Furthermore, the idea argumentation mapper 108 may similarly, or as a result, identify axiomatic core values as endpoints of a map of related arguments or ideas. In some examples, the agents, objects, incentives, values, audience, and the interrelationship between them may be displayed as a state-machine. Transitions between states of the state-machine may map the kind and amount of influence between the agents, objects, audience, and respective incentives and values. Further, the agents, objects, audience, and respective incentives and values may be processed as data primitives, for example, stored within a data object for later access by the argumentation analytics engine 110. For example, the argumentation analytics engine 110 may update existing or generate new ontologies based on the data object and included primitives. In another example, users 210 may review primitives related to processed natural language content or may explore listings of primitives processed by the system.

Figure 11:
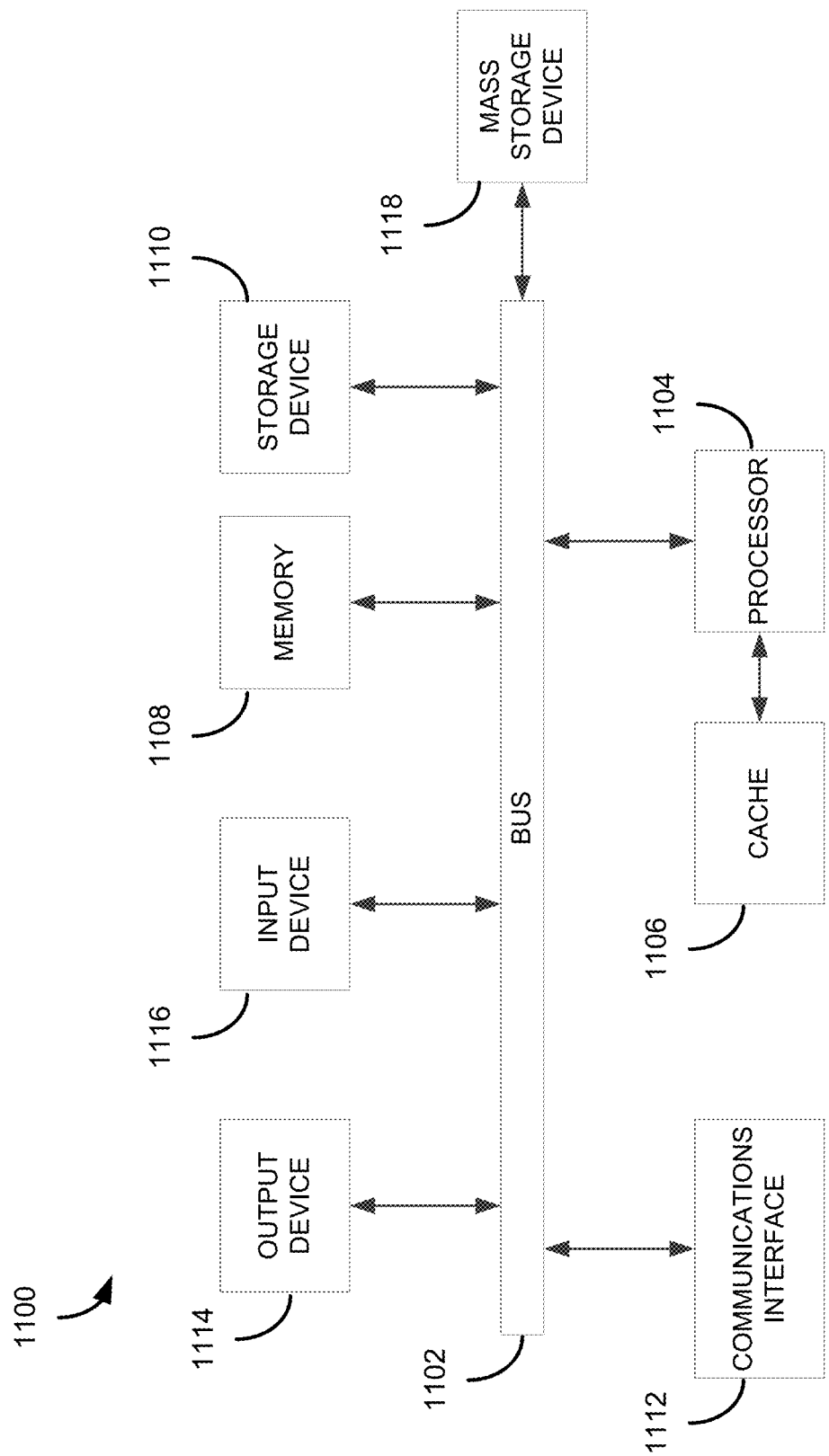
FIG. 11 is a system diagram of an example computing system that may implement various systems and methods discussed herein in accordance with various embodiments of the subject technology.

FIG. 11 is an example computing system 1100 that may implement various systems and methods discussed herein. The computer system 1100 includes one or more computing components in communication via a bus 1102. In one implementation, the computing system 1100 includes one or more processors 1104. The processor 1104 can include one or more internal levels of cache 1106 and a bus controller or bus interface unit to direct interaction with the bus 1102. The processor 1104 may specifically implement the various methods discussed herein. Main memory 1108 may include one or more memory cards and a control circuit (not depicted), or other forms of removable memory, and may store various software applications including computer executable instructions, that when run on the processor 1104, implement the methods and systems set out herein. Other forms of memory, such as a storage device 1110 and a mass storage device 1118, may also be included and accessible, by the processor (or processors) 1104 via the bus 1102. The storage device 1110 and mass storage device 1118 can each contain any or all of the methods and systems discussed herein.

The computer system 1100 can further include a communications interface 1112 by way of which the computer system 1100 can connect to networks and receive data useful in executing the methods and system set out herein as well as transmitting information to other devices. The computer system 1100 can also include an input device 1120 by which information is input. Input device 1116 can be a scanner, keyboard, and/or other input devices as will be apparent to a person of ordinary skill in the art. An output device 1114 can be a monitor, speaker, and/or other output devices as will be apparent to a person of ordinary skill in the art.

The system set forth in FIG. 11 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the methods can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a computer-readable storage medium having stored thereon instructions, which may be used to program a computer system (or other electronic devices) to perform a process according to the present disclosure. A computer-readable storage medium includes any mechanism for storing information in a form (e.g., software, processing application) readable by a computer. The computer-readable storage medium may include, but is not limited to, optical storage medium (e.g., CD-ROM), magneto-optical storage medium, read only memory (ROM), random access memory (RAM), erasable programmable memory (e.g., EPROM and EEPROM), flash memory, or other types of medium suitable for storing electronic instructions.

The description above includes example systems, methods, techniques, instruction sequences, and/or computer program products that embody techniques of the present disclosure. However, it is understood that the described disclosure may be practiced without these specific details.

While the present disclosure has been described with references to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for processing natural language arguments, the method comprising:
    receiving a set of natural language input;
    associating a proposition tag with a first portion of the natural language input identified as including a first proposition, the proposition tag linking the first portion of the natural language input to an emotionally neutral proposition value;
    associating a rhetorical argument type with a second portion of the natural language input, the associated rhetorical argument type identified based on rules for determining an amount of support for an argument that a proposition provides;
    tabulating a conclusion based on the first proposition and the identified rhetorical argument type; and
    generating a map of the set of natural language input for display, wherein the map visually illustrates that the first portion of the natural language input associated with the proposition tag and that the second portion of the natural language input is associated with the identified rhetorical argument type.

2. The method of claim 1, further comprising:
    associating a second proposition tag with a third portion of the natural language input identified as including a second proposition, the second proposition tag linking the third portion of the natural language input to a second emotionally neutral proposition value;
    organizing the first proposition and the second proposition based on the identified rhetorical argument type; and
    identifying an interrelationship between the first proposition and the second proposition.

3. The method of claim 1, further comprising locating the first proposition within a proposition taxonomy, the first proposition taxonomy comprising a plurality of hierarchically-organized propositions, wherein the map is a proposition flow tree comprising a neighbor proposition and the first proposition, the neighbor proposition adjacent to the first proposition within the proposition taxonomy.

4. The method of claim 3, further comprising identifying an interrelationship between the first proposition and the neighbor proposition, the interrelationship reflecting an effect that a likelihood of truth of the neighbor proposition has on a likelihood of truth of the first proposition.

5. The method of claim 3, further comprising identifying a proposition conflict based on the proposition flow tree, the proposition conflict comprising two or more incompatible propositions within the proposition flow tree.

6. The method of claim 5, further comprising evaluating the two or more incompatible propositions to identify a respective likelihood of truth.

7. The method of claim 1, further comprising:
identifying an agent of the natural language input and an object of the natural language input, the agent impacting the object;
identifying an incentive of the agent;
determining a core value of the agent based on the incentive and the object; and
generating a component of persuasive leverage based on one of the core value, the incentive, and the object.

8. The method of claim 1, wherein the map further includes at least one flag indicating a burden of proof associated with the first proposition.

9. The method of claim 1, wherein the rhetorical argument type corresponds to a rhetorical principle, and wherein the rhetorical argument type is based on whether the rhetorical principle is violated by the argument in relation to the proposition.

10. The method of claim 9, wherein the rhetorical principle is associated with at least one of fact being contradicted, argument by analogy, category mismatch, solution being proposed, consequence being asserted, outcome different from intent, topic shift or splitting, non-sequitur, questions of degree, confusion of subject agency or affected parties, assignment of burden of proof, question begging, or incompleteness of a set.

11. A system for processing natural language arguments, the system comprising:
a user interface that receives a set of natural language input;
a processor that executes instructions stored in memory, wherein execution of the instructions by the processor:
associates a proposition tag with a first portion of the natural language input identified as including a first proposition, the proposition tag linking the first portion of the natural language input to an emotionally neutral proposition value;
associates a rhetorical argument type with a second portion of the natural language input, the associated rhetorical argument type identified based on rules for determining an amount of support for an argument that a proposition provides;
tabulates a conclusion based on the first proposition and the identified rhetorical argument type; and
generates a map of the set of natural language input for display, wherein the map visually illustrates that the first portion of the natural language input associated with the proposition tag and that the second portion of the natural language input is associated with the identified rhetorical argument type; and
a display screen that displays the generated map.

12. The system of claim 11, wherein the processor executes further instructions to:
associate a second proposition tag with a third portion of the natural language input identified as including a second proposition, the second proposition tag linking the third portion of the natural language input to a second emotionally neutral proposition value;
organize the first proposition and the second proposition based on the identified rhetorical argument type; and
identify an interrelationship between the first proposition and the second proposition.

13. The system of claim 11, wherein the processor executes further instructions to locate the first proposition within a proposition taxonomy, the first proposition taxonomy comprising a plurality of hierarchically-organized propositions, wherein the map is a proposition flow tree comprising a neighbor proposition and the first proposition, the neighbor proposition adjacent to the proposition within the proposition taxonomy.

14. The system of claim 13, wherein the processor executes further instructions to identify an interrelationship between the first proposition and the neighbor proposition, the interrelationship reflecting an effect that a likelihood of truth of the neighbor proposition has on a likelihood of truth of the first proposition.

15. The system of claim 13, wherein the processor executes further instructions to identify a proposition conflict based on the proposition flow tree, the proposition conflict comprising two or more incompatible propositions within the proposition flow tree.

16. The system of claim 15, wherein the processor executes further instructions to evaluate the two or more incompatible propositions to identify a respective likelihood of truth.

17. The system of claim 11, wherein the processor executes further instructions to:
identify an agent of the natural language input and an object of the natural language input, the agent impacting the object;
identify an incentive of the agent;
determine a core value of the agent based on the incentive and the object; and
generate a component of persuasive leverage based on one of the core value, the incentive, and the object.

18. The system of claim 11, wherein the map further includes at least one flag indicating a burden of proof associated with the first proposition.

19. A non-transitory computer-readable storage medium, having embodied thereon a program executable by a processor to perform a method for processing natural language arguments, the method comprising:
receiving a set of natural language input;
associating a proposition tag with a first portion of the natural language input identified as including a first proposition, the proposition tag linking the first portion of the natural language input to an emotionally neutral proposition value;
associating a rhetorical argument type with a second portion of the natural language input, the associated rhetorical argument type identified based on rules for determining an amount of support for an argument that a proposition provides;
tabulating a conclusion based on the first proposition and the identified rhetorical argument type; and
generating a map of the set of natural language input for display, wherein the map visually illustrates that the first portion of the natural language input associated with the proposition tag and that the second portion of the natural language input is associated with the identified rhetorical argument type.

* * * * *